April 28, 1931.  W. N. BOOTH  1,802,372
COVER PLATE FOR VEHICLE WHEELS
Filed July 6, 1926
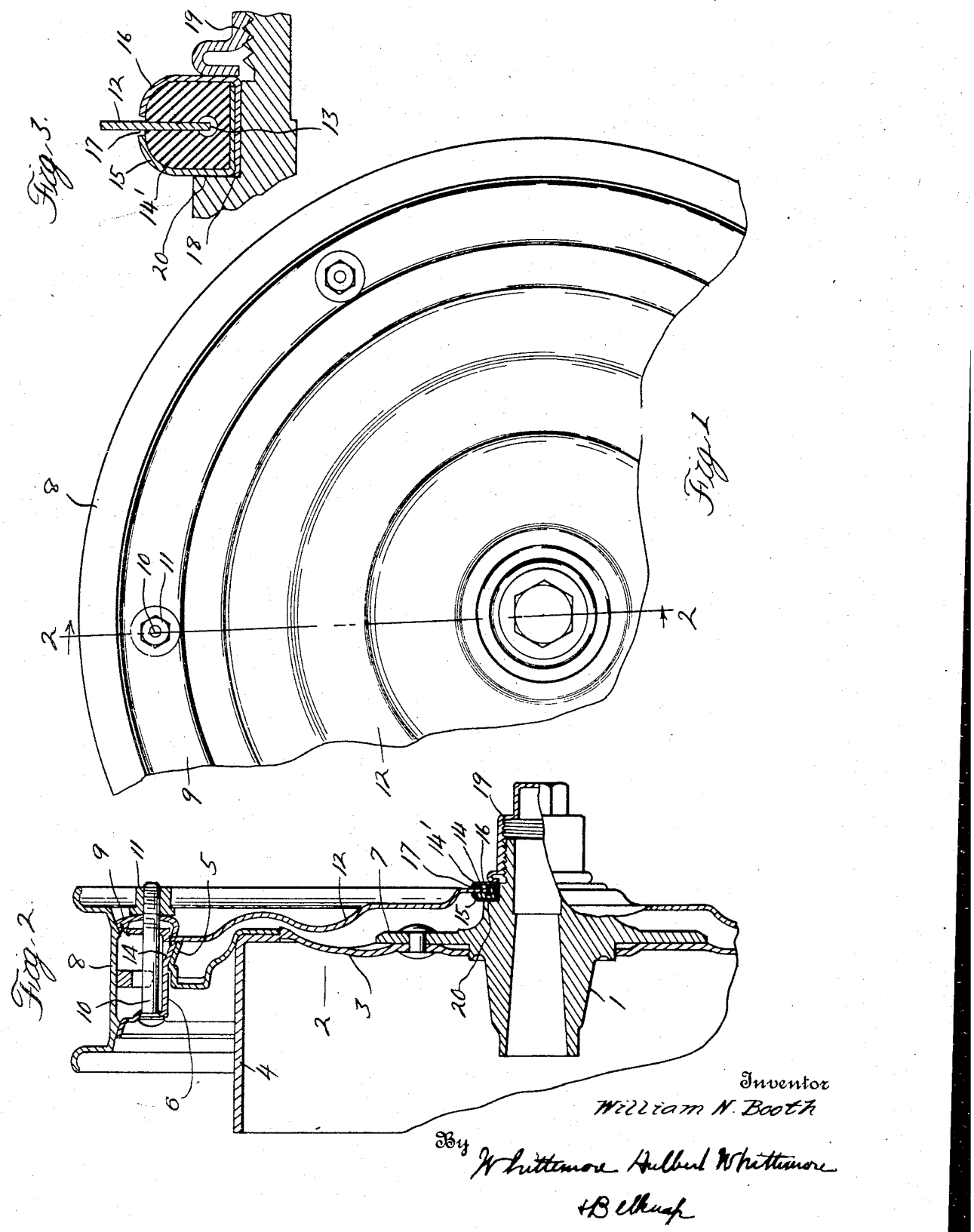
Inventor
William N. Booth
By Whittemore Hulbert Whittemore
+Belknap
Attorneys Patented Apr. 28, 1931

1,802,372

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

COVER PLATE FOR VEHICLE WHEELS

Application filed July 6, 1926. Serial No. 120,769.

The invention relates to vehicle wheels and refers more particularly to cover plates therefore. One of the objects of the invention is to provide means for securing a cover plate to a wheel in such a way that splitting of the cover plate either during its manufacture or its use is avoided. Another object is to provide means for securing the cover plate to the vehicle wheel which conceals a portion of the cover plate so that this portion need not be finished. With these as well as other objects in view the invention resides in the novel features of construction and combinations and arrangements of parts as more fully hereinafter set forth.

In the drawings:—

Figure 1 is a side elevation of a portion of the vehicle wheel embodying my invention;

Figure 2 is a cross section on the line 2—2 of Figure 1;

Figure 3 is an enlarged cross section of a portion thereof.

As shown in the present instance, 1 is the hub of the vehicle wheel and 2 is the wheel body which comprises the web 3 of the brake drum 4, the annular spacer 5 and the felly 6. The web is fixedly secured to the radical flange 7 of the hub and the spacer is fixedly secured at its inner edge to the web and at its outer edge to the felly. 8 is the demountable tire carrying rim which is adapted to be seated upon the felly and to be secured thereto by means of the clamping ring 9 through the clamping bolts 10 which extend transversely through the felly and clamping ring and the nuts 11 threadedly engaging the outer ends of the bolts and abutting the clamping ring.

12 is the metallic cover plate having the central opening 13 for sleeving over the hub. The outer edge of this cover plate is adapted to be rigidly clamped against the wheel body immediately adjacent the felly. As shown, the felly has the radially inwardly depressed tongues 14 engaging in recesses formed in the outer edge of the spacer and the outer edge of the cover plate is clamped against the ends of these tongues and the outer edge of the spacer by the clamping ring.

To secure the inner edge of the cover plate to the hub and avoid splitting of the cover plate either during its manufacture or during its use, I have provided the annular yieldable member 14' which is preferably formed of rubber and embraces the inner edge of the cover plate. This annular member is embraced by the telescoping inner and outer sections 15 and 16, respectively, which form a casing and have their outer edges spaced from each other to form the opening 17 for the free passage therethrough of the cover plate into the annular member. The inner portion of the outer section 16 telescopes over the inner portion of the inner section 15 and its edge 18 is preferably crimped over the inner section to lock these two sections together. For securing the casing to the hub there is the hub cap 19 which is threaded upon the hub and abuts the outer section 16 of the casing and forces the inner section 15 against the annular shoulder 20 formed upon the hub.

With this construction weaving of the wheel body may cause weaving of the cover plate but inasmuch as the inner edge of the cover plate is yieldably secured in place splitting of the cover plate is avoided. Since the inner edge portion of the cover plate is in the same plane and not crimped over or beaded splitting in manufacture is also avoided. Furthermore since the inner edge portion of the cover plate is inclosed and concealed it need not be finished.

What I claim as my invention is:

1. In a vehicle wheel, the combination with a hub and wheel body mounted upon said hub, of a cover plate and means for securing said cover plate to one of said first mentioned members, including an annular yieldable member embracing an edge of said cover plate and a casing embracing said annular member and having an opening for the passage therethrough of said cover plate into said annular member.

2. In a vehicle wheel, the combination with a hub and wheel body mounted upon said hub, of a cover plate having a central opening for sleeving over said hub, an annular yieldable member engaging opposite sides of said cover plate at its inner edge, a casing embracing said annular member and having an opening therethrough for the passage of said cover plate into said annular member, and means upon said hub engageable with said casing for securing the latter to said hub.

3. In a vehicle wheel, the combination with a hub and wheel body mounted upon said hub, of a cover plate for said wheel body having a central opening for sleeving over said hub, an annular yieldable member embracing the inner edge of said cover plate, telescoping members forming a casing for the inner edge of said annular member and having spaced edges forming an opening for the passage of said cover plate into said annular member and a hub cap engageable with said casing for securing the same to said hub.

4. In a vehicle wheel, the combination with a hub and a wheel body mounted upon the hub, a member formed of resilient material secured to the hub and a cover plate for the wheel body having its inner edge portions embedded in the said member.

5. In a vehicle wheel, the combination with a hub and a wheel body mounted upon said hub, of a cover plate having a central opening for sleeving over said hub, and an annular non-metallic yieldable member engaging opposite sides of said cover plate at its inner edge.

6. In a vehicle wheel, the combination with a hub and a wheel body mounted upon said hub, of a cover plate having a central opening for sleeving over said hub, an annular non-metallic yieldable member surrounding said hub and engaging opposite sides of the cover plate at its inner edge, and means upon the hub for holding said annular member in place.

7. In a vehicle wheel, the combination with a hub and a wheel body mounted upon the hub, of a cover plate for said wheel body member, yieldable means engaging opposite sides of the cover plate at its inner edge and means for clamping the yieldable means to the hub.

In testimony whereof I affix my signature.

WILLIAM N. BOOTH.